United States Patent [19]

Brook, III

[11] Patent Number: 5,673,105
[45] Date of Patent: Sep. 30, 1997

[54] SCANNING SYSTEM COVER HAVING A PLURALITY OF BENDING AXES

[75] Inventor: Mark George Brook, III, Londonderry, N.H.

[73] Assignee: AGFA Division, Bayer Corporation, Wilmington, Mass.

[21] Appl. No.: 597,718

[22] Filed: Feb. 7, 1996

[51] Int. Cl.⁶ ................................................. G03B 27/62
[52] U.S. Cl. ............................................. 355/75; 355/129
[58] Field of Search .............................. 355/72, 74, 75, 355/76, 128, 129

[56] References Cited

U.S. PATENT DOCUMENTS

| | | |
|---|---|---|
| 986,915 | 3/1911 | Foedish ................................ 355/129 |
| 3,167,997 | 2/1965 | Robin ................................. 355/74 X |
| 3,944,364 | 3/1976 | Petrini et al. ........................ 355/74 |
| 4,248,530 | 2/1981 | Bockemuhl-Simon et al. ........ 355/74 |

*Primary Examiner*—Fred L. Braun
*Attorney, Agent, or Firm*—John A. Merecki

[57] ABSTRACT

A cover for holding a document to be scanned against the transparent scanning surface of a scanning system. The cover includes at least one hinged "bending axis" about which a portion of the cover may be pivotally displaced without affecting the remaining portion(s) of the cover. Preferably, the bending axes are such that the cover may be pivoted about either of two lines corresponding to the diagonal axes of the rectangular cover.

7 Claims, 4 Drawing Sheets

SCANNING SYSTEM COVER HAVING A PLURALITY OF BENDING AXES

FIELD OF THE INVENTION

The present invention relates in general to scanning systems including a transparent scanning surface. More particularly, the present invention is directed to an improved cover for holding a document to be scanned, hereinafter referred to as an "original", flat against the transparent scanning surface of a scanning system.

BACKGROUND OF THE INVENTION

In a typical prior art scanning system, a rigid, unitary cover is used to secure one or more originals against a transparent scanning surface prior to scanning. Generally, one side of the cover is pivotally secured to the main body of the scanning system via a hinge mechanism or the like, thereby allowing the cover to be raised and lowered in its entirety to position original(s) on the transparent scanning surface. Unfortunately, due in part to the relatively large size of the cover, it is difficult to suitably position (or reposition) a plurality of smaller originals on the transparent scanning surface for scanning. Indeed, even the slight air turbulence created by partially opening or closing the cover oftentimes dislodges the originals from their desired positions on the transparent scanning surface.

SUMMARY OF THE INVENTION

In order to overcome the deficiencies of the prior art, the present invention provides an improved cover for holding originals against the transparent scanning surface of a scanning system. Such scanning systems may include document scanners, electrophotographic copiers and the like.

A preferred embodiment of the present invention includes a rectangular cover which is hinged on one side to the top of a scanning system adjacent to a transparent scanning surface, thereby allowing the cover to be raised or lowered in its entirely relative to the transparent scanning surface. The cover further includes at least one hinged "bending axis" about which a portion of the cover may be pivotally displaced without affecting the remaining portion(s) of the cover. Preferably, the bending axes are such that the cover may be pivoted about either of two lines corresponding the diagonal axes of the rectangular cover. Advantageously, this configuration provides a user with a plurality of options for manipulating the cover for the placement of various size originals, with the assurance that the originals will remain in place on the transparent scanning surface.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
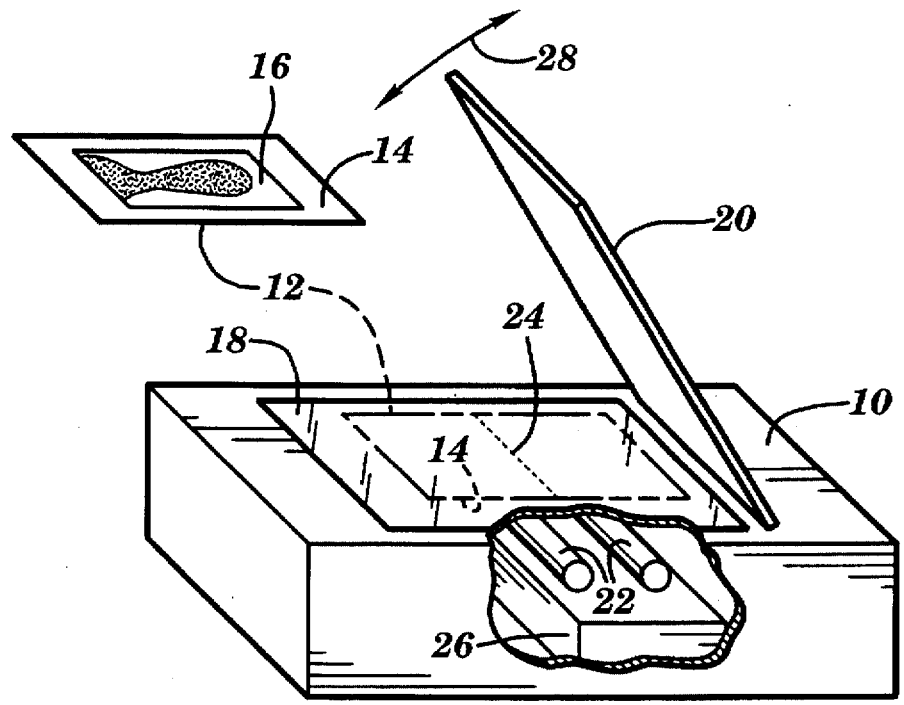
FIG. 1 illustrates a prior art scanning system including a conventional one-piece cover.

Referring now specifically to the accompanying drawings, there is illustrated a scanning system including an improved cover in accordance with the present invention, wherein like reference numerals refer to like elements throughout the drawings.

In FIG. 1, a prior art scanning system 10 is configured for the scanning of a reflective original 12. The reflective original 12 is placed with the surface 14 containing the image 16 to be scanned facing down on a transparent scanning surface 18, and held in place by a conventional, rigid, unitary scanner cover 20. The surface is illuminated from below by lamps 22, producing a scan line 24. The scanning optics and sensor electronics are located in a scan module 26, which is driven together with lamps 22 such as to move the scan line 24 across the length of the original 12, thereby scanning the original 12 to produce a digital representation thereof. The scanner cover 20 is pivotally secured on one side to the main body of the scanning system 10 via a hinge mechanism (not shown), thereby allowing the cover 20 to be raised and lowered in its entirety as indicated by directional arrow 28 to position one or more reflective originals 12 on the transparent scanning surface 18.

Figure 2:
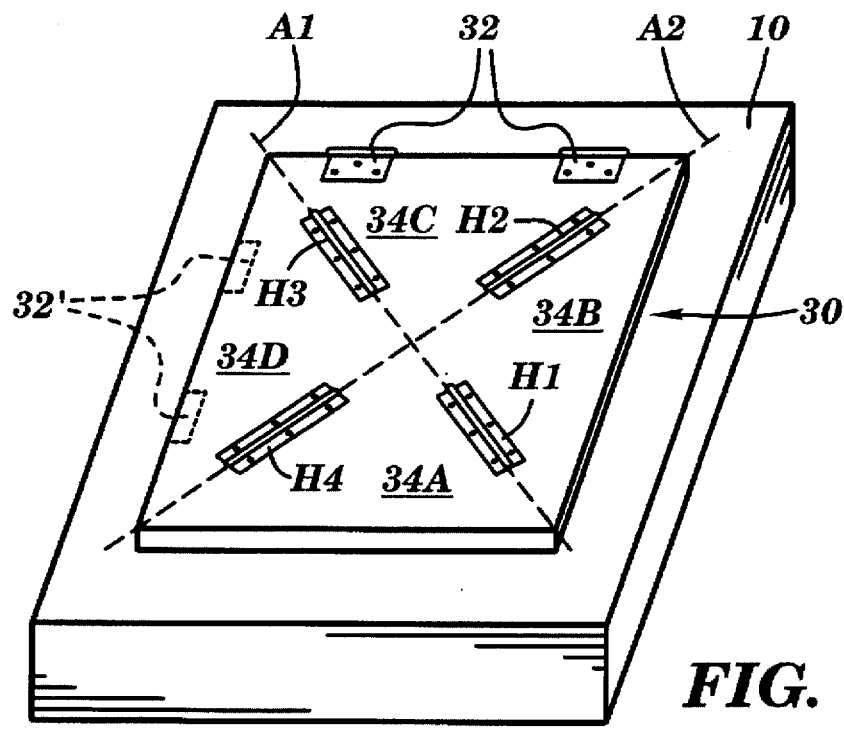
FIG. 2 is a perspective view of a cover for a scanning system in accordance with a preferred embodiment of the present invention.
Figure 3:
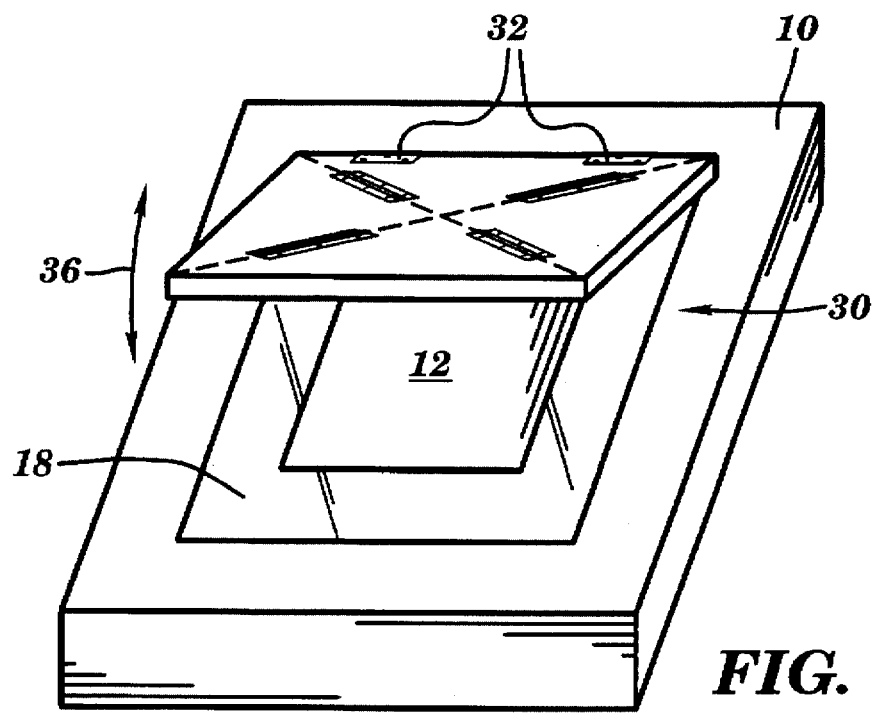
FIG. 3 illustrates the cover of FIG. 2 in an open position.

Referring now to FIGS. 2–3, there is illustrated a rectangular cover 30 for a scanning system 10 in accordance with a preferred embodiment of the present invention. One side of the cover 30 is hinged to the body of the scanning system 10 by hinge assembly 32 (or alternately 32'), allowing the entire cover 30 to be raised or lowered as a single, rigid unit relative to the transparent scanning surface 18. The cover 30 is formed from a plurality of individual cover panels 34a, 34b, 34c, 34d, joined together in a predetermined relationship by a plurality of hinge members H1, H2, H3, H4. When the cover 30 is pivoted about the hinge assembly 32 as shown in FIG. 3, the individual cover panels 34a, 34b, 34c, 34d cooperate to provide a rigid cover for the scanning system 10. The opening and closing of the cover is indicated by directional arrow 36 in FIG. 3. The hinge assembly 32 and the hinge members H1, H2, H3, H4 may be formed using any suitable type of hinges including, for example, conventional hardware hinges as shown, or plastic "living" hinges.

Figure 7:
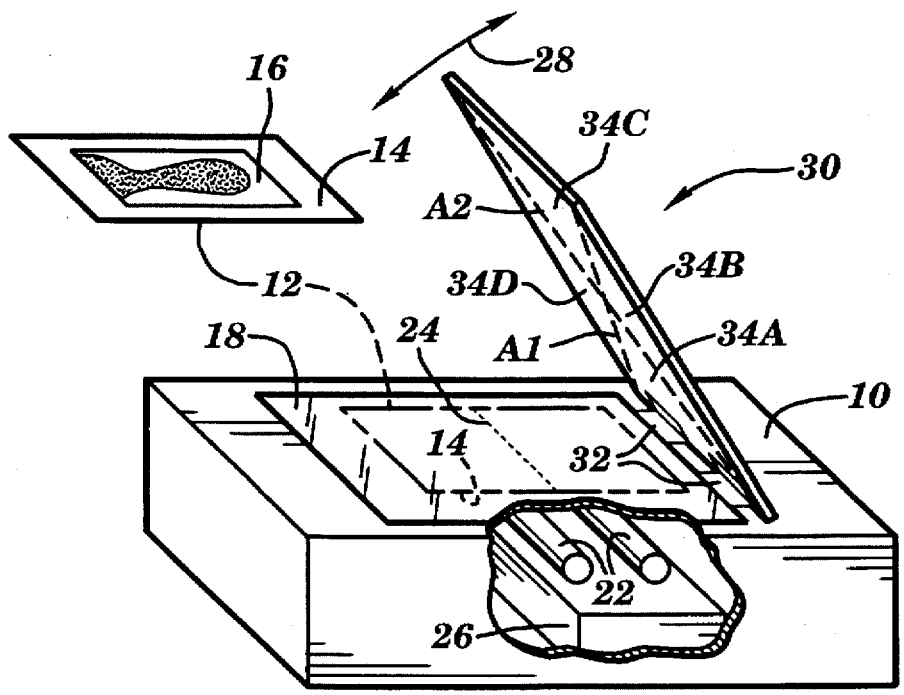
FIG. 7 illustrates a scanning system incorporating the improved cover of the present invention.
Figure 4:
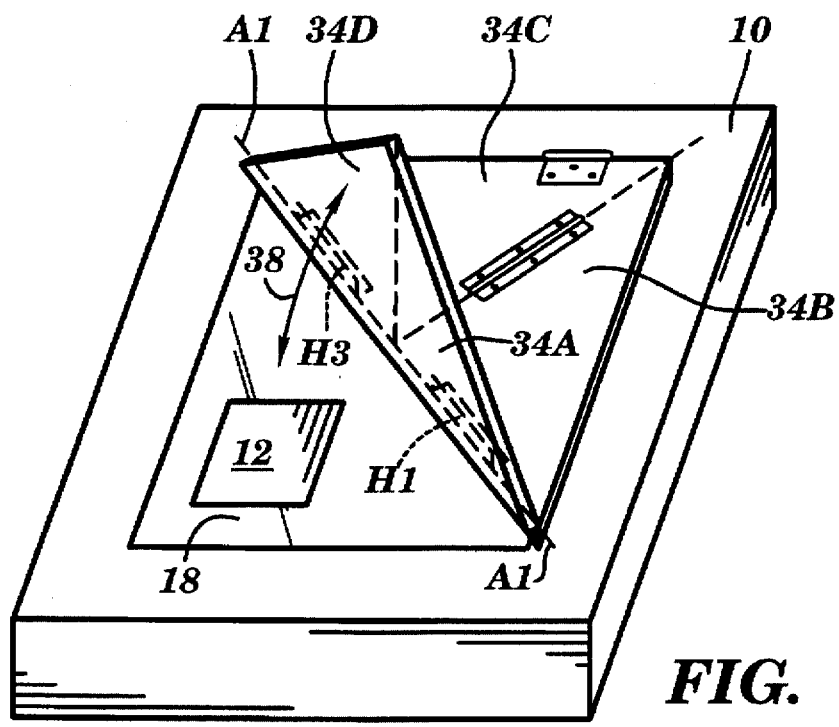
FIG. 4 illustrates the cover partially open, with a first flap portion pivoted about a first diagonal bending axis to an open position.

The cover panels 34a, 34b, 34c, 34d and the hinge members H1, H2, H3, H4 are interconnected to allow specific pairs of adjacent cover panels to be selectively raised or lowered to expose a portion of the transparent scanning surface 18 without disturbing the remaining portion: (i.e., cover panels) of the cover 30. As shown in FIG. 4, cover panels 34a and 34d are pivotally coupled about a first diagonal bending axis A1 by hinge member H1. Similarly, cover panels 34c and 34d are pivotally coupled about the first diagonal bending axis A1 by hinge member H3. By coupling the cover panels in this manner, cover panels 34a and 34d may be pivoted as a unit about bending axis A1 (directional arrow 38), thereby allowing an original 12 to be positioned/repositioned on, or removed from, the transparent scanning surface 18 without disturbing other originals previously positioned under panels 34b and 34c. In FIG. 7, the cover 30 of the present invention is used in conjunction with scanning system 10 (FIG. 1) in lieu of the conventional, one-piece cover 20.

Figure 5:
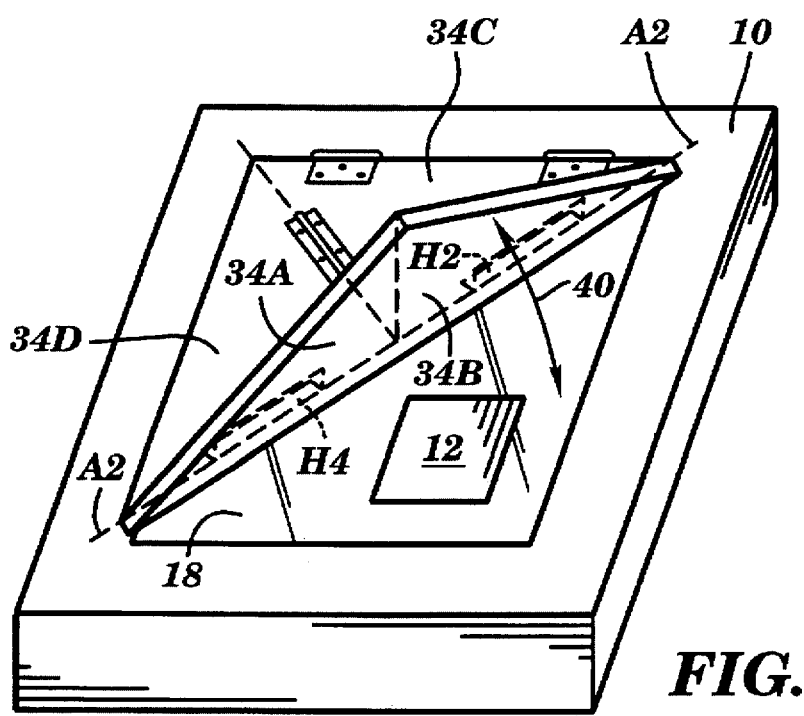
FIG. 5 illustrates the cover partially open, with a second flap portion pivoted about a second diagonal bending axis to an open position.

Referring now to FIG. 5, a second diagonal bending axis A2 is provided to allow panels 34a and 34b to be pivoted as a unit (directional arrow 40) without displacing panels 34c and 34d away from the transparent scanning surface 18. In this configuration, cover panels 34a and 34b are pivotally coupled about the second diagonal bending axis A2 by hinge member H4, and cover panels 34b and 34c are pivotally coupled about the second diagonal bending axis A2 by hinge member H2.

Figure 6:
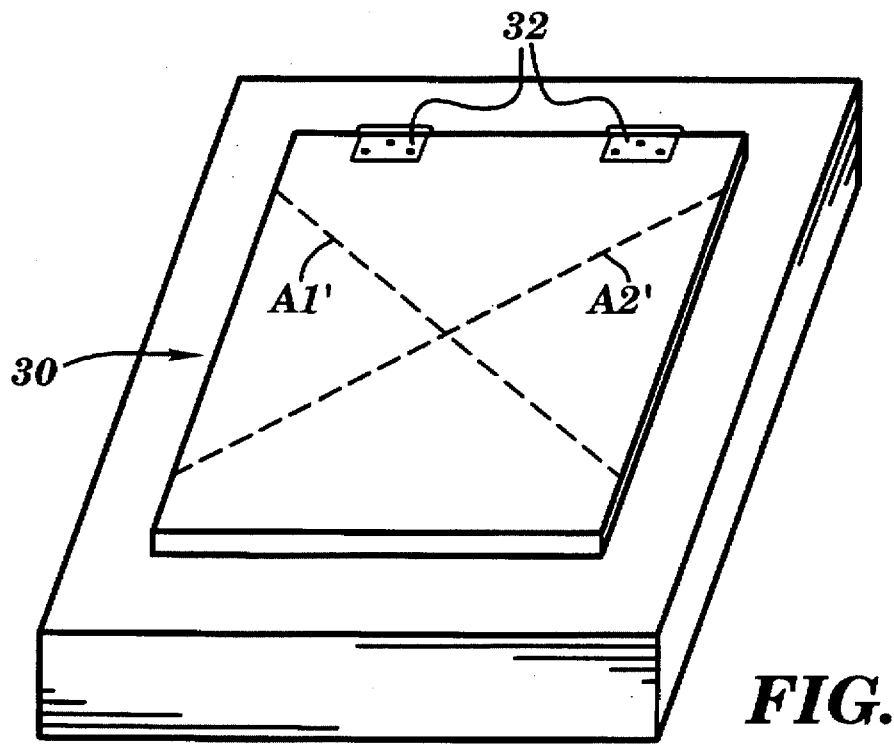
FIG. 6 is a perspective view of a cover for a scanning system in accordance with a second embodiment of the present invention.

In the embodiment of the present invention illustrated in FIGS. 2–5, the diagonal bending axes A1, A2 extend through opposing corners of the cover 30, thereby symmetrically dividing the cover 30 into a plurality of triangular cover panels. As shown in FIG. 6, however, the bending axes (hinge members not shown) may also extend between opposing sides (or between the corners and sides) of the cover 30 without departing from the scope of the present invention. Again, the cover 30 may be opened or closed as a single unit via the hinge assembly 32, or pairs of the cover panels may be selectively pivoted about a bending axis A1' or A2' as described above.

Figure 8:
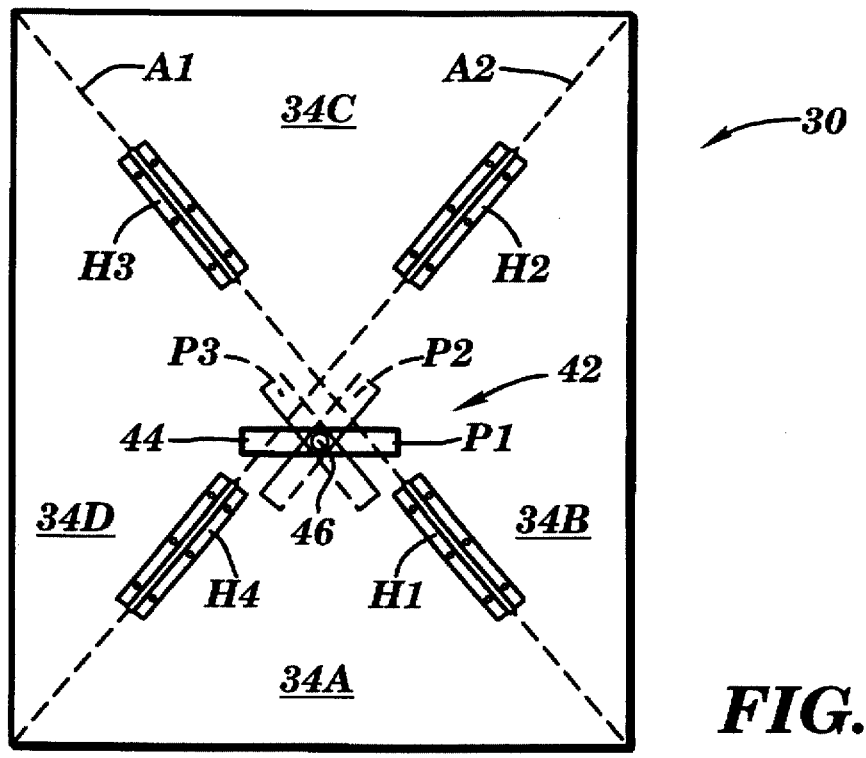
FIG. 8 illustrates a locking mechanism for the cover of the present invention.

A locking mechanism 42 for selectively locking all or specific pairs of the cover panels 34a, 34b, 34c, 34d together is illustrated in FIG. 8. In its preferred embodiment, the locking mechanism 42 includes a flat, rigid bar 44 formed of metal, plastic or other suitable material, rotatably secured to cover panel 34a at pivot point 46 proximate the intersection of the bending axes A1, A2. When the bar 44 is disposed at position P1, the opposing ends of the bar 44 extend across the bending axes A1, A2 onto cover panels 34b, 34d, effectively locking all of the cover panels 34a, 34b, 34c, 34d together as a single, rigid, planar unit. Advantageously, when in position P1, the bar 44 prevents the cover panels 34a, 34b, 34c, 34d from "wobbling" relative to one another as the cover 30 is raised or lowered.

When rotated to position P2, the bar 44 extends across bending axis A1 between cover panels 34a and 34b, thereby locking cover panels 34a, 34b together. In this position, the bar 44 prevents cover panels 34a, 34b from "wobbling" relative to one another as they are pivoted together about bending axis A2 (see FIG. 5). In a similar manner cover panels 34a, 34d are locked together then the bar 44 is rotated to position P3.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. A cover for a scanning system comprising:

a plurality of cover panels, said cover panels collectively forming said cover;

first hinge means for pivotally securing said plurality of cover panels together along a plurality of substantially diagonal bending axes, wherein selective combinations of said cover panels can be pivoted about said plurality of substantially diagonal bending axes; and second hinge means for pivotally securing at least one of said cover panels to said scanning system, wherein said plurality of cover panels can be pivoted as a unit relative to said scanning system.

2. The cover for a scanning system according to claim 1, further including:

locking means for releasably locking a selected pair of said cover panels together, wherein said locked pair of cover panels can be pivoted as a unit about one of said substantially diagonal bending axes.

3. The cover for a scanning system according to claim 1, further including:

locking means for releasably locking said plurality of cover panels together as a single, rigid, planar unit.

4. A cover for a scanning system comprising:

a plurality of cover panels, said cover panels collectively forming said cover;

first hinge means for pivotally securing said plurality of cover panels together along a plurality of substantially diagonal bending axes, wherein a first pair of said cover panels can be pivoted as a unit about a first one of said substantially diagonal bending axes, and a second pair of said cover panels can be pivoted as a unit about a second one of said substantially diagonal bending axes, said first and second pairs of cover panels sharing a common cover panel; and second hinge means for pivotally securing at least one of said cover panels to said scanning system, wherein said plurality of cover panels can be pivoted as a unit to raise or lower said cover.

5. The cover for a scanning system according to claim 4, further including:

locking means for releasably locking a selected pair of said cover panels together, wherein said locked pair of cover panels can be pivoted as a unit about one of said substantially diagonal bending axes.

6. The cover for a scanning system according to claim 4, further including:

locking means for releasably locking said plurality of cover panels together as a single, rigid, planar unit.

7. A cover for a scanning system comprising:

a plurality of triangular cover panels collectively forming a rectangular cover for said scanning system;

a hinge assembly for pivotally securing adjacent ones of said triangular cover panels together along first and second diagonal bending axes, wherein a first pair of said cover panels can be pivoted about said first diagonal bending axis and a second pair of said cover panels can be pivoted about said second bending axis, said first and second pairs of cover panels sharing a common cover panel; and hinge means for pivotally securing at least one of said cover panels to said scanning system, wherein said plurality of cover panels can be pivoted as a unit to raise or lower said cover.

* * * * *